No. 766,004. PATENTED JULY 26, 1904.
E. G. THOMAS.
AUTOMATIC WEIGHING MACHINE.
APPLICATION FILED DEC. 17, 1896.
NO MODEL. 3 SHEETS—SHEET 1.
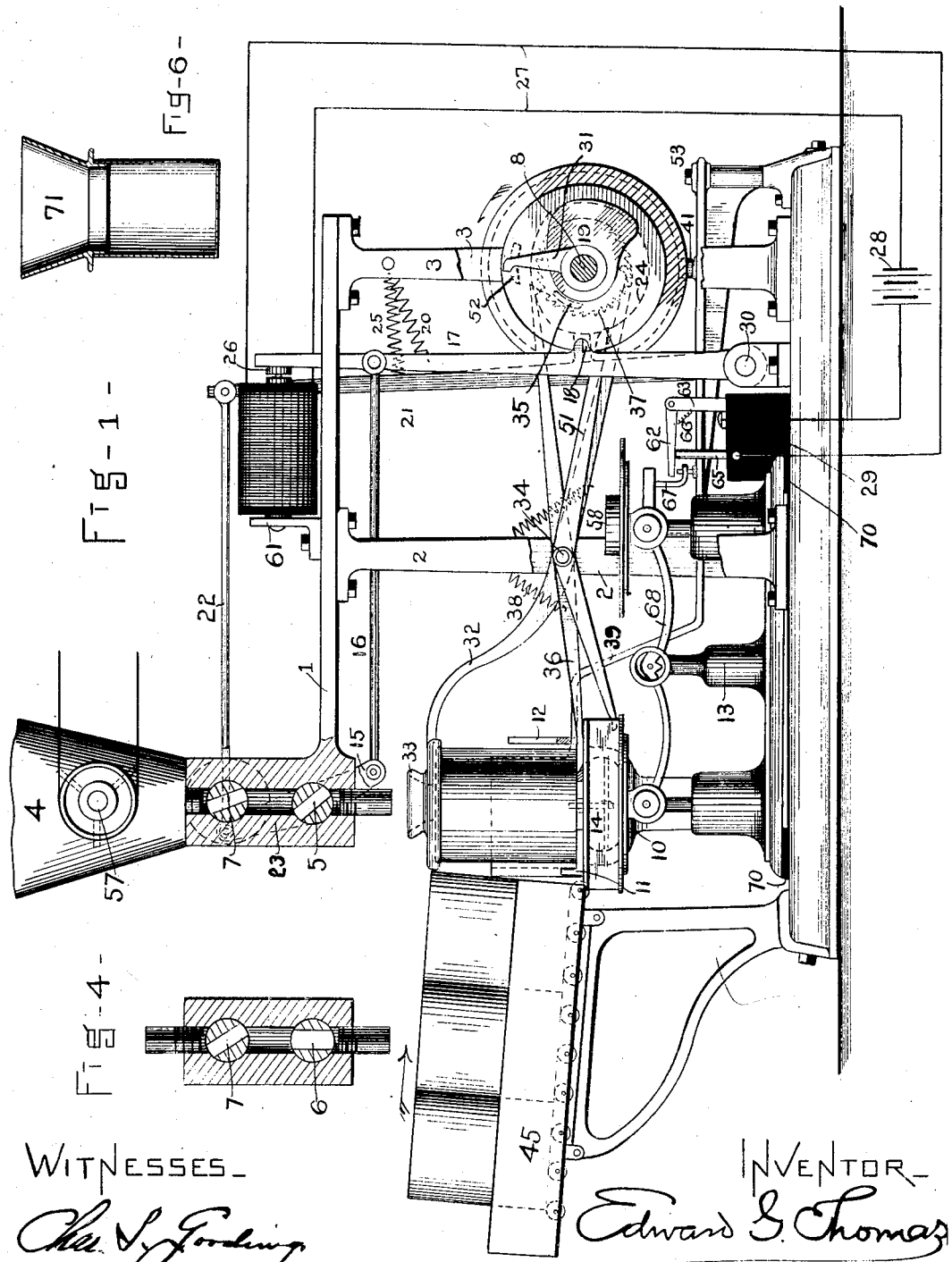

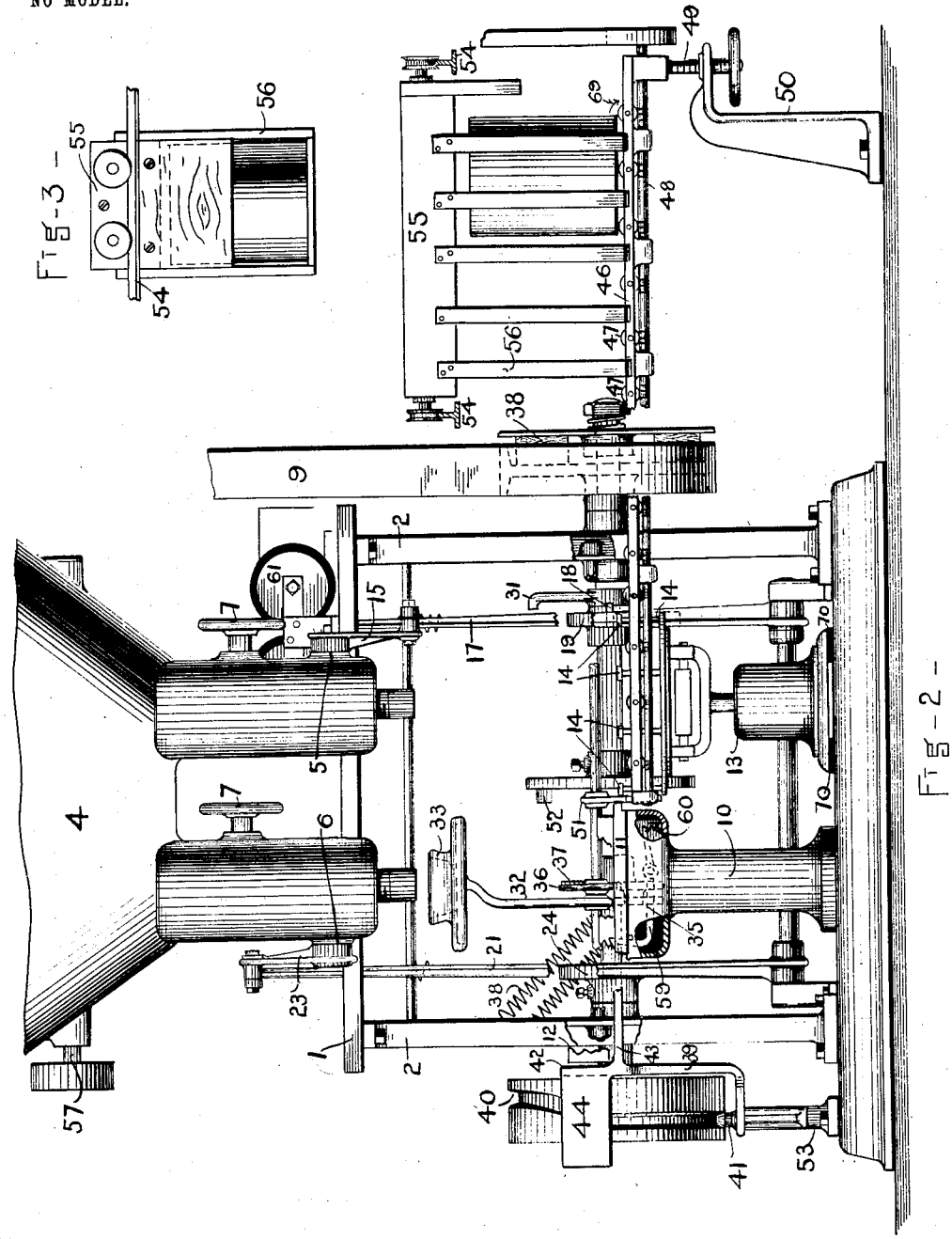

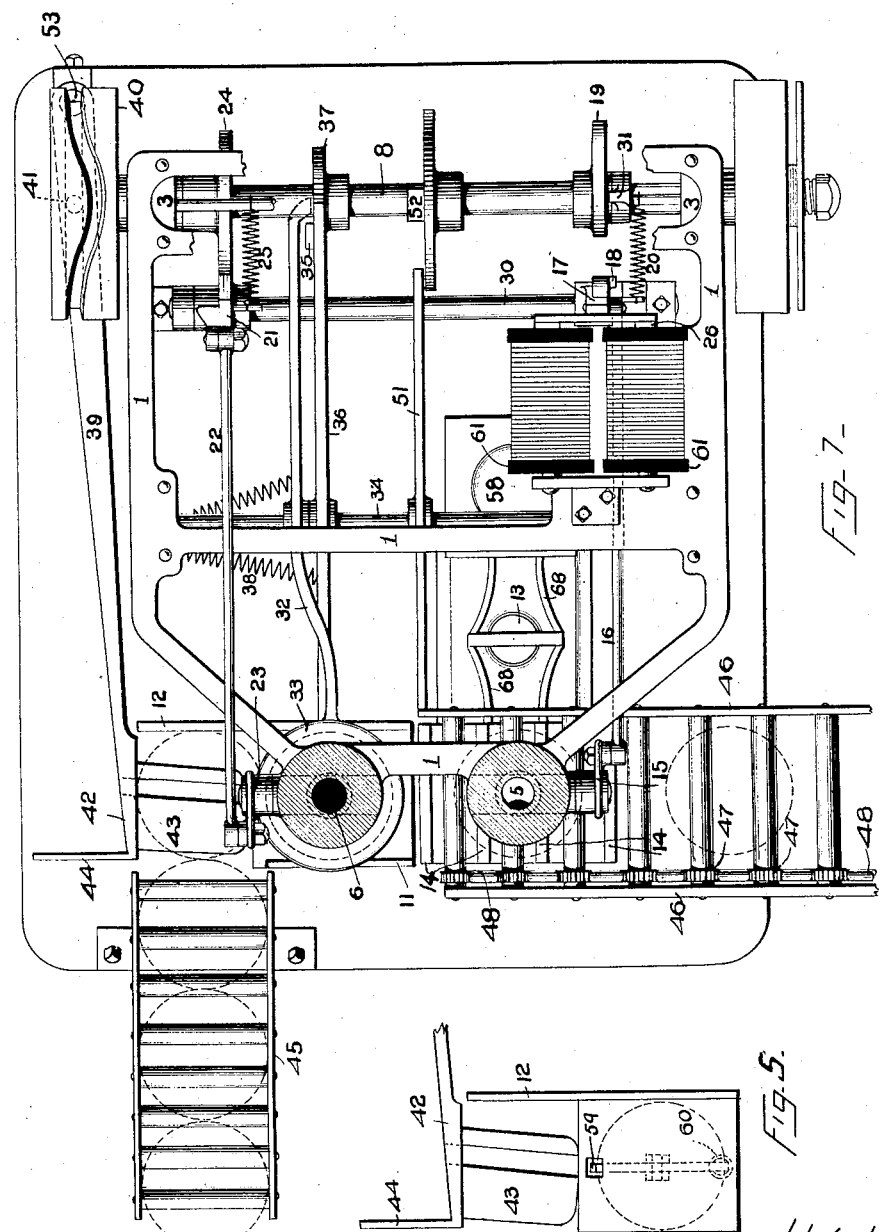

No. 766,004. Patented July 26, 1904.

UNITED STATES PATENT OFFICE.

EDWARD G. THOMAS, OF BOSTON, MASSACHUSETTS, ASSIGNOR, BY MESNE ASSIGNMENTS, TO AUTOMATIC WEIGHING MACHINE COMPANY, OF NEW YORK, N. Y., A CORPORATION OF NEW YORK.

AUTOMATIC WEIGHING-MACHINE.

SPECIFICATION forming part of Letters Patent No. 766,004, dated July 26, 1904.

Application filed December 17, 1896. Serial No. 616,068. (No model.)

*To all whom it may concern:*

Be it known that I, EDWARD G. THOMAS, a citizen of the United States, residing at Boston, in the county of Suffolk and State of Massachusetts, have invented certain new and useful Improvements in Automatic Weighing-Machines, of which the following is a specification.

My invention relates to that class of automatic weighing-machines in which in order to combine speed with accuracy each load is brought to the required size by means of two operations, during the first of which an approximate load is obtained quickly and during the second of which the complete load is made up by means of a small or drip stream. So far as I am aware the approximate load has always been obtained hitherto either by a preliminary measuring or weighing operation accomplished by a measuring device or scale operating separately from the scale on which the final load is weighed or by cutting down the size of a single stream delivered to the scale prior to the completion of the load therein. The employment of such preliminary measuring or weighing devices, however, adds to the cost and complexity of the machines, while in the operation of those machines which employ but one scale and cut down during the weighing operation the size of the stream delivered thereto it is evident that there will be a lack of economy in time, because of the fact that the main stream and the drip-stream will be consecutive in their operation and not contemporaneous. Furthermore, many dry and powdery materials—such as baking-powder, for example—tend to clog and "blow" when quickly discharged in considerable quantities from one receptacle into another and also tend to adhere to the walls of such receptacles, so that in weighing such materials the use of a preliminary weighing or measuring device is disadvantageous, because it provides just so much extra surface for the material to adhere to and also accumulates in operation a quantity of material which it is difficult to deliver rapidly to a receptacle or supplementary scale-pan without causing the material to blow and scatter.

My present invention is designed to simplify and otherwise to improve upon these prior machines by doing away with all forms of preliminary measuring or weighing devices, as well as all devices for varying during the weighing operation the size of the stream delivered to the scale on which the complete weight is obtained, and also to produce a machine of increased capacity and rapidity of operation without loss of accuracy in the results obtained.

To these ends a main feature of my invention may be stated, broadly, to consist in obtaining the approximate load by what may be termed a "time stream," material being supplied to the receptacle thereby for a predetermined interval of time, and in completing the load by means of a small or drip stream delivered to the receptacle while supported upon a scale to which the partially-filled receptacle is transferred, the drip-stream being cut off by the tipping of the scale as soon as the load is completed. Preferably the arrangement is such that a preliminary approximate load may be delivered to each receptacle simultaneously with the completion of the previously-obtained approximate load upon the scale, so that each complete load may be obtained in the time required for the operation of the drip-stream alone by properly regulating the quantity delivered by the time stream. This latter quantity is preferably delivered through a valve arranged to be opened and closed automatically by the operation of the machine at the proper time, so that said quantity in the case of a given material will depend only upon two factors—namely, the size of the stream and the time during which it is allowed to run—and may readily be adjusted by varying either of said factors, preferably the former. The delivery of the bulk load in a stream directly into the receptacle also practically overcomes any tendency to blowing and scattering in case a material of the nature of baking-powder is being weighed, because the bulk load of material is delivered gradually and in a continuous stream which can be kept running with substantial evenness and regularity and without clogging.

Machines made according to my invention are well adapted for use in weighing liquid materials, and hence I have herein shown and described my invention as comprising means for conveying filled receptacles away from the weighing-machine proper without danger of slopping or spilling the contents; but my invention is not limited to the weighing of such materials, and that portion thereof which accomplishes the weighing operation itself may be used without the conveying device herein shown.

My invention also comprises certain other subordinate features which will hereinafter be set forth at length.

A weighing apparatus embodying a preferred form of my invention is illustrated in the accompanying drawings, which are diagrammatic in character and are not intended to show the exact details of commercial construction.

In said drawings, Figures 1 and 2 are respectively a side elevation and a front elevation of a weighing-machine from which a conveying device, hereinafter described, for removing filled receptacles has been omitted. Fig. 3 is an end view of a tray, hereinafter described. Fig. 4 is a central vertical section through the main valve of the machine. Fig. 5 is a plan view of a support, hereinafter described, showing also a portion of a device for feeding empty receptacles to the machine. Fig. 6 is a central vertical section through a receptacle and a supplementary hopper carried by it. Fig. 7 is a plan view of the machine, sectioned just below certain adjusting-valves, hereinafter described.

In the machine shown in the drawings, 1 represents a table supported by standards 2 2 3 3 on a suitable base and carrying or otherwise connected with a bin 4, adapted to receive a quantity of material to be weighed. Two independent passages or feed-chutes lead from the bottom of the bin 4 and are respectively provided with suitable valves or other flow-controlling devices 5 and 6, by which the flow of material to the receptacles is governed. I prefer to provide an additional valve 7 above each of the valves 5 and 6, by means of which the maximum rate of flow of the material through said valves may be regulated.

A pedestal or other support 10 is located at the front of the machine directly under the valve 6, which will hereinafter be termed the "main" valve. The top of the pedestal 10 is so constructed as to adapt it to receive empty receptacles successively and to allow them to be removed therefrom at the proper times, and for this purpose it may be provided with two vertical strips 11 and 12, located, respectively, at its front and rear edges, forming guides between which the receptacles may slide. Beneath the valve 5 is located the pan or platform of a scale 13, on which the successive loads are completed. In order to adapt the weighing mechanism to be used in connection with the apparatus, hereinafter described, for feeding and removing the receptacles, I prefer to support upon the platform of the scale a number of vertically-arranged parallel strips 14, separated from one another by suitable distances and of such height that their upper surfaces will lie in the same plane substantially on a level with the top of the support 10 and adjacent thereto, so that they will form collectively a horizontal support adapted to receive a receptacle when delivered thereto from said support 10.

For operating the valves 5 and 6 at the proper times I employ a mechanism so constructed that after a receptacle has been filled with an approximate load delivered to it while on the support 10 the main valve 6 will be closed, and thereupon after said receptacle has been moved onto the strips 14 it will receive a drip-stream from the valve 5 until its load has been completed, whereupon the tilting of the scale-beam will cause the instantaneous closing of said valve 5. The said mechanism, as preferably constructed, comprises a shaft 8, journaled at the rear end of the machine and provided with a driving device 38, to which power is applied through a belt 9, tending to turn said shaft in the direction of the arrow shown in Fig. 1. The driving mechanism 38 is preferably a frictional device adapted to permit the stopping of the shaft 8 without interrupting the movement of the belt 9. The main valve 6 is provided with an arm 23, connected by a link 22 to a lever 21, which is journaled on a fixed shaft 30 and is adapted to be moved forward by the action of a cam 24, secured to the shaft 8 and herein shown as bearing against a rearwardly-extending projection formed on said lever. The backward movement of the lever 21 may be affected by means such as a spring 25, secured thereto and to the framework of the machine. These parts are so arranged that a forward movement of the lever 21, due to the action of the cam 24, will open the valve 6, and said cam has a comparatively long working surface, so that it will hold the valve 6 open during the greater part of each revolution of the shaft 8, said valve being closed by the spring 25 whenever such action is permitted by the cam 24. As thus constructed it will be seen that during each revolution of the shaft 8 the main valve 6 will be opened and will permit a stream of material to pass through it during a definite time, at the end of which time said valve will be automatically closed. The rate at which the material will flow through this valve when open may be regulated with accuracy by the corresponding supplementary valve 7, so that by means of the mechanism just described a succession of loads approximately equal to each other and to the desired weight may be delivered to a corresponding series of receptacles placed beneath the main valve 6.

The opening and closing of the drip or secondary valve 5 may conveniently be affected by means similar to those employed to operate the valve 6, such as an arm 15, secured to the valve 5 and connected by a link 16 with a lever 17, journaled on the rod 30 and arranged to be acted upon by a cam 19, secured to the shaft 8. The cam 19 operates to open the valve 5, which may be closed by means of a spring 20, corresponding in its operation to the spring 25. The working surface of the cam 19 is preferably made short, so that it can act upon the lever 17 during a small part only of its rotation, the valve 5 being at other times free to be closed by the spring 20, provided its closing movement is not otherwise restrained.

The closing movement of the drip-valve 5 is controlled by means operative with the tilting of the scale 13, and I prefer to employ electrical means for this purpose on account of the quickness of operation thereby secured. Thus in the machine shown in the drawings I employ a magnet 61, mounted on the table 1 and included in an energizing-circuit comprising wires 27, a battery 28 or other source of electric energy, and a circuit-breaker 29, comprising a lever 62 preferably made of aluminium for the sake of lightness and pivoted at one end to a support 63, its other end being adapted normally to rest upon a post 65, with which it has no electrical connection, except at the point of contact. The parts 63 and 65 are made of metal or other material which will conduct electricity and are connected in series with the two wires 27, so that so long as the lever 62 is in contact with the post 65 an electrical circuit through the magnet 61 will be completed and said magnet will be energized and will attract its armature 26, which is secured to the lever 17, the parts being so located and arranged that when the armature 26 is attracted and held by the magnet 61 the valve 5 will be in the drip-stream position, but will instantly be closed by the action of the spring 20 upon the breaking of the circuit through said magnet. This circuit is arranged to be broken by the tilting of the beam 68 of the scale 13 as soon as a full load has been completed upon said scale, and to this end I provide a bent finger 67, secured to the beam 68 and preferably provided with an adjusting-screw located just beneath the free end of the lever 62, so that upon the rising of that end of the scale-beam on which the weight 58 is located said screw will engage and lift the lever 62, and thus break the circuit through the magnet 61.

In order to prevent the opening of the valve 6 after it has once been closed before the approximately-filled receptacle has been removed from beneath it, I prefer to provide a stop mechanism adapted to arrest the rotation of the shaft 8 at a predetermined point during each rotation in case such rotation is completed prior to the completion of a load on the scale 13 and the substitution of empty and partially-filled receptacles beneath the valves 6 and 5, respectively. To this end I secure an arm 31 to the shaft 8 and provide a stop 18 on the lever 17 at such a point that when the lever 17 is held in its forward position by the magnet 61 said stop 18 will lie in the path of the laterally-bent end of the arm 31, so that if by the rotation of the shaft 8 the arm 31 is carried into engagement with the stop 18 while the valve 5 remains open such rotation will cease until the load has been completed under the valve 5, at which time the magnet 61 will release the lever 17, the valve 5 will be closed, the stop 18 will simultaneously be withdrawn from under the end of the arm 31, and the rotation of the shaft will recommence. The position of the arm 31 with respect to the cam 24 is such that when the rotation of the shaft 8 is stopped, as above described, the main valve 6 will be closed. It will now be seen that the reason for employing a friction driving mechanism, such as 38, is to allow the continuous motion of the driving-belt, whether or not the shaft 8 be free to rotate, and thereby to effect the instantaneous starting of said shaft as soon as liberated.

The parts above described embody that portion of my invention which relates to the weighing operation strictly, and I will now describe a complete cycle of operations of these parts, since the other portions of my invention are in a sense supplementary thereto and need not necessarily be employed in connection therewith. Assuming that the machine is in operation and that the parts thereof are in the position shown in Fig. 1, there will be on the support 10 a receptacle partially filled by material discharged through the main valve 6, which has now been open for a part of the period of rotation of the shaft 8. On the scale 13 is another receptacle, which during the previous cycle operations has been given an approximate load under the main valve and is now receiving a small or drip stream of material through the secondary valve 5 in order to complete the required load. The secondary valve 5 is now being held open by the action of the magnet 61 on its armature 26, the energizing-circuit of the magnet being closed at the circuit-breaker 29, because the weight of the receptacle and its contents does not yet exceed that of the weight 58. The spring 20 is under tension and will therefore close the valve 5 when the armature 26 and lever 17 are released by the magnet 61, and the spring 25 is also under tension and will act to close the main valve 6 when a backward movement of the lever 21 is permitted by the shape of the cam 24 as the shaft 8 rotates. As the rotation of the shaft 8 continues and the arm 31 approaches the stop 18 the valve 6 is closed by the action of the spring 25, and as soon as the arm 31 engages said stop the motion of the shaft 8 ceases and the receptacle on the scale 13 continues to receive a small stream of material through the secondary valve 5 until finally the required load is completed, the weight 58 is overbalanced and the scale-beam 68 tilts, thereby lifting the lever 62 from the post 65 and breaking the circuit through the magnet 61, whereupon the valve 5 is instantly closed by the action of the spring 20, and the stop 18 is withdrawn from under the end of the arm 31. The shaft 8 then recommences its rotation under the action of the friction driving device 38, and immediately the filled receptacle is removed from the scale 13 the receptacle which has previously received an approximate load is transferred from the support 10 to said scale, and an empty receptacle is placed upon said support 10. These last three operation may be performed by hand or by any suitable automatic mechanism—such, for example, as hereinafter described. As the shaft 8 rotates the valves 5 and 6 are opened by the cams 19 and 24, and the operations above described are again performed in the same order.

It will be evident that great rapidity of operation combined with accuracy may be obtained by means of my present invention without employing more than one scale, the sole function of my scale being to complete approximate loads successively delivered to it simultaneously with the making up of such approximate loads by independent mechanism. My invention is thus adapted to save the time required in many prior machines for making up an approximate load by weight and for transferring the same to a secondary weighing bucket or receptacle and also does away with all forms of preliminary measuring devices as well, thus reducing the simplicity of the apparatus to its lowest terms. It will be seen that if the required weight is completed in a receptacle on the scale 13 before the shaft 8 completes a rotation and brings the arm 31 into engagement with the stop 18 then the lever 17 will be released and will move backward under the influence of the spring 20 and close the valve 5 before the completion of such rotation of the shaft 8, in which case said arm 31 will not engage the stop 18 at all, and the rotation of the shaft 8 will be continuous. The operation of the machine will be the most rapid when this condition of affairs exists, and such condition may readily be brought about by adjusting the valves 7 7.

I will now describe that portion of my invention which relates to the feeding of receptacles through the machine and to the conveying away of said receptacles after they have been filled. For the purpose of supplying empty receptacles successively and automatically to the support 10 I prefer to employ a lever 39, pivoted near the rear of the machine, as at 53, so as to swing horizontally, its movements being effected by a cam 40, secured to the shaft 8 and adapted to engage a roller 41, secured to said lever. At its front or free end the lever 39 is provided with a substantially horizontal portion 43, projecting laterally toward the support 10 and located at such a height that it may be moved over the top of said support close to the same. This portion 43 provides a supporting-surface adapted to receive a receptacle from a suitable conveying device and to swing it upon the lateral movement of the lever 39 over the support 10, where the receptacle will be engaged by a hook or stop 59, which normally projects above the top of the support 10, being pressed upward by a spring 60 and being so constructed as to allow the receptacle to pass over it when being moved onto said support, but to engage the bottom edge thereof and prevent its withdrawal upon the reverse movement of the lever 39. The portion 43 is slotted, as shown, to permit the operation of said stop 59.

The empty receptacles may be brought to the machine by any suitable conveying device, such as a chute 45, arranged at right angles to the guides 11 and 12 and having its bottom formed of a series of parallel rollers, over which the receptacles will slide by gravity, the portion 43 of the lever 39 being adjacent to the lower end of the chute 45 when the parts are in the position shown in Fig. 7. The movement of each receptacle as its passes onto the surface 43 is guided by a vertical portion 42, formed at the end of the lever 39, substantially in line with one edge of the chute 45, and is finally arrested by the guide 12, which is extended far enough to reach across the end of said chute above the path of said lever. The lever 39 is also provided at its extreme free end with an arm 44, extending substantially at right angles with said lever and being thus adapted to act as a cut-off to hold the receptacles on the chute 45 when the lever 39 is actuated to deposit a receptacle on the support 10, by which movement the arm 44 is brought directly across the lower end of said chute. As thus constructed, it will be apparent that whenever the parts of the machine assume the position shown in Fig. 7 a receptacle will slide from the chute 45 onto the supporting-surface 43, where it will be held by the guides 12 and 42 and will itself serve to block the further movement of the receptacles which remain upon the chute 45. Upon the actuation of the lever 39 by the cam 40 that receptacle which is carried by the free end of said lever will be moved over the support 10, as above described, and will simultaneously push onto the scale 13 that receptacle which has next previously been deposited upon said support and has received a partial load thereon. At the same time the arm 44 will hold the receptacles on the chute 45 against downward movement until the lever 39 has moved back into the position shown in Fig. 7, whereupon another receptacle will slide onto the supporting-surface 43, which will have been dragged from under the receptacle which it previously carried on account of the engagement of the latter by the stop 59, and the feeding mechanism will be ready for another operation after the proper interval.

For removing filled receptacles I provide a frame 46, in which are journaled a series of parallel rollers 47, which are continuously driven in the direction of the arrow 69, Fig. 2, by a shaft 48 and suitable gearing, such as worm-gears, carried by said rollers and meshing with corresponding worms on the shaft 48, the latter being driven by a belt or otherwise. The frame 46 is adjustably supported at its outer end by means such as a screw 49, carried by a pedestal 50, and is also supported at the inner edge of its other end on the end of a lever 51, pivotally secured to the framework of the machine, as at 34. The rollers 47 are so spaced that they will pass between the parallel strips 14, which form the scale-pan of the scale 13. While a weighing operation is in progress the position of the frame 46 is such that the tops of the rollers 47 are below the tops of said strips, and hence a receptacle on the scale will rest wholly upon said strips and not upon the rollers, so that the scale will be acted upon by the entire weight of the receptacle and its contents. When a weighing operation has been completed, the inner end of the frame 46 is raised slightly by means of a cam 52, secured to the shaft 8 and acting upon the lever 51, the engagement of the screw 49 with said frame being sufficiently loose to permit a slight tilting of the latter, and thereby the filled receptacle is lifted from the strips 14 and its weight is transferred to the rollers 47. Since these rollers are continuously rotating, the filled receptacle will at once be moved away from the machine, and as soon as it has been moved beyond the scale-pan the frame 46 is lowered to its normal position by the action of the cam 52 and lever 51, so that when the next partially-filled receptacle is pushed onto said scale-pan it will rest upon and be wholly supported by the strips 14.

The conveying device formed by the frame 46 and its rotating rollers 47 may itself be constructed to transfer the filled receptacles to any desired point. I have shown, however, a supplementary conveying device which is particularly intended for handling liquids and may be used in connection with said frame 46 and preferably consists of a tray 55, supported by and adapted to travel upon a pair of rails 54, which are supported in any suitable manner above the frame 46 and transversely to it. The tray 55 comprises a rectangular frame, to which are fastened depending loops 56, preferably of metal. These loops are spaced apart at the same distances as the rollers 47, their position being such that said rollers may be raised or lowered between said loops in such manner as to bring the top surface of the lower member of each loop below the tops of said rollers, and when in this position a receptacle will roll freely along the rollers 47 and pass over the loops 56, as will be obvious. To transfer a receptacle from the rollers to the loops, the frame 46 is lowered by the screw 49 until the tops of the rollers are below the loops. The first loops to appear above the level of the rollers will be those at the extreme end of the frame 46, so that the first receptacle will be deposited on the tray 55 at that point, and by lowering the frame 46 at the proper rate, by hand or by suitable connections with the machine, the successive receptacles will be deposited in the tray at the proper points without jar. When the tray 55 is full of receptacles, it is moved along the rails 54 and another is substituted.

In order to diminish the effect on the scale 13 of vibration in the machine, I prefer to support said scale upon springs 70, of rubber or metal, which form a resilient or yielding support for the scale and, being located between it and the valve-operating mechanism and other moving parts of the machine, serve to absorb vibrations produced thereby, and thus to prevent them from being imparted to the scale and affecting its sensitiveness. I consider this form of support to have an important influence on the accuracy of the weighing operation, since a movement of the scale-beam due to a jar, if sufficient to cause the finger 67 to lift the lever 62, will result in closing the secondary valve before the correct amount has been deposited in the receptacle. I also prefer so to adjust the adjusting-screw in the finger 67 that a certain amount of motion may occur in the scale-beam without raising the lever 62, in order still further to diminish the effect of vibration, and in addition to these precautions a light spring 66, tending to hold the lever 62 against the post 65, may be provided, which will resist the inertia of the very small mass of said lever.

In weighing automatically many solid substances, particularly those which are light and powdery, it usually happens that each of the receptacles for the weighed material unless undesirably large is more than filled by a complete or approximate load when such load is first emptied into the receptacle, and it is therefore usually desirable to provide some means for shaking down or settling the material within the receptacles and for taking care of the excess material while such settling action is taking place. For the purpose of holding such excess material I prefer to employ the device shown in the drawings, comprising a funnel-shaped cover 33 of suitable size to fit the top of a receptacle and secured to one end of a lever 32, which is pivotally supported on the axis 34 and is so arranged that the cover 33 will be movable vertically above the support 10. Thus by moving the lever 32 at the proper moments the cover 33 may be fitted and held to the top of a receptacle while the latter is receiving material through the main valve and may be lifted therefrom to permit the removal of such receptacle onto the scale 13 and the substitution of an empty receptacle therefor, so that the said cover will provide a temporary auxiliary receptacle sufficient to hold the excess material which is delivered through the main valve 6 until such material has been shaken down in the receptacle by suitable means. For operating the lever 32 at the proper intervals a cam 35 may be secured to the shaft 8 and arranged to engage the rear end of said lever, which may be held against the cam 35 either by the weight of the cover 33 or by a suitable spring. For the purpose of settling the material within the receptacle while on the support 10 a lever 36, pivotally supported on the axis 34, may be employed and may be given a vibratory motion by means of a ratchet 37, secured to the shaft 8 and operating on the rear end of said lever, which is held against the ratchet by the spring 38 and is so arranged at its front end that it will strike a quick succession of blows upon the bottom of the receptacle when acted upon by said ratchet and spring.

The operation of the entire machine above described will be readily understood. The various cams carried by the shaft 8 will have such contours respectively and will be so located with respect to one another that the various operations of the machine will be performed at the proper intervals, as follows: Upon the completion of a load on the scale 13 and the simultaneous movement of the lever 17 to close the valve 5 the shaft 8, if it has been stopped by the arresting of the arm 31, as above described, will recommence its motion, whereupon the first cam to come into action will be cam 52, which will operate the lever 51, and thereby lift the carrier-frame 46 until the filled receptacle is raised from the strips 14 and is removed by the rollers 47, when said frame 46 will move back into its normal position. The lever 39 will then move under the action of the cam 40 and will push the receptacle previously received from the chute 45 between the guides 11 and 12 of the support 10 and against the receptacle last deposited upon said support, which latter receptacle will thereby be pushed onto the strips 14 of the scale 13 into proper position to receive a flow of material from the secondary valve 5. The lever 39 will then move back toward its original position, carrying with it the empty receptacle, which is upon the supporting-surface 43, until said receptacle is engaged by the hook 59, whereupon by the continued motion of the lever 39 the portion 43 will be withdrawn from under said receptacle and will leave the same resting on the support 10 in proper position to receive material from the main valve 6. As soon as the lever 39 has deposited the receptacles under the valves 5 and 6, as above described, these valves will be opened by the cams 19 and 24. The cover 33 will then be lowered under the action of the cam 35, and the ratchet 37 will immediately commence to vibrate the lever 36, and thus cause it to settle the contents of the receptacle under the main valve. As the rotation of the shaft 8 continues and the arm 31 approaches the stop 18 the cam 24 will permit the closing of the main valve 6 under the action of the spring 25, the ratchet 37 will cease to operate the lever 36, the cover 33 will be raised from the receptacle on the support 10 by the action of the cam 35 on the lever 32, and no further change will occur until the arm 31 strikes the stop 18 and the motion of the shaft 8 ceases. The receptacle on the scale will then continue to receive a small stream of material through the secondary valve until its load is completed, whereupon the cycle of operation above described will be repeated. In case a load is completed on the scale 13 before the arm 31 reaches the stop 18 the motion of the shaft 8 will be continuous, as above set forth, and such stop mechanism is employed rather as a safety device than as an essential part of the weighing mechanism, and may be dispensed with, if desired, whenever the rate of flow of the material being weighed is sufficiently uniform to permit of its regulation by the valves 7 with sufficient accuracy.

The machine herein shown and described may be modified in many particulars, as will be obvious. The valves shown are merely conventional valves and may be replaced by any other form of flow-controlling device which may be suited to the material to be handled. The filling of the receptacles may be accomplished to any desired extent through the secondary valve by partly or wholly closing the valve 7 over the main valve 6, and in such case, since it will be undesirable to shake down the material in the receptacles while on the scale, a number of hoppers 71 of the form shown in Fig. 6 and carefully adjusted to have equal weights may be provided. These hoppers will be placed on the receptacles before they are fed into the machine and will serve to hold any excess in the bulk of the loose material over the capacity of the receptacles, which loose material may be packed into the receptacles by hand after they have been delivered from the machine or by a subsequent operation of the machine itself. If desired, these hoppers 71 may be used instead of the covers 33 in the ordinary operation of the apparatus. If the substance to be weighed is of a powdery nature and has a tendency to clog or to flow unevenly, an agitating device 57, located within the bin 4, may be employed.

By employing power-driven mechanism for opening the valves 5 and 6 and causing them to be held open against the tension of a spring or equivalent force I provide for the prompt and certain closing of said valves at the proper instants without relying upon the weight of the material for effecting such closing action, and I am thereby enabled to obtain results of greater accuracy, especially in weighing small quantities. It is to be understood that my invention is not limited to any particular form of mechanism for actuating said valves or to any particular form of scale for performing the weighing operation.

My invention is best adapted for obtaining gross weights, since the weight of the receptacle is added to that of the material throughout the weighing operation; but net weights may be obtained by constructing or adjusting the receptacles to have equal weights, as will be obvious.

I claim as my invention—

1. In an automatic weighing apparatus, the combination with two feed-chutes each adapted to discharge directly into a different receptacle and both in succession directly into the same receptacle, a support located beneath one of said feed-chutes, a scale located beneath the other feed-chute arranged to receive a receptacle from said support, means for cutting off the flow from one feed-chute after it has been open for a predetermined interval of time, and means operating with the tipping of the scale for cutting off the flow from the other feed-chute.

2. An automatic weighing apparatus, comprising, in combination, a main valve and a secondary valve, means for opening said valves simultaneously, means for automatically closing the main valve after it has been open for a predetermined definite period of time, a scale, and means operative with the tipping of said scale for closing the secondary valve.

3. In an automatic weighing apparatus, the combination with two feed-chutes each adapted to discharge directly into a different receptacle and both in succession directly into the same receptacle, a support located beneath one of said feed-chutes, a scale located beneath the other feed-chute, means for transferring a partially-filled receptacle from said support to said scale, means for cutting off the flow from one feed-chute after it has been open for a predetermined interval of time, and means operating with the tipping of the scale for cutting off the flow from the other feed-chute.

4. In an automatic weighing apparatus, the combination, with a support, a valve arranged to deliver material thereto, and means for automatically closing said valve after it has been open for a predetermined definite period of time, of a scale, a secondary valve arranged to deliver material thereto, means operative with the tipping of said scale for closing said secondary valve, and means for transferring a receptacle from said support to said scale.

5. In a package-filling machine, the combination of two feed-chutes which discharge successively into the same package and which discharge simultaneously into different packages, means which cut off the flow from one chute after a predetermined period of time, and a cut-off for the second chute controlled by the weight of the filled package, substantially as described.

6. In a weighing and package-filling machine, the combination of two hoppers, mechanism which carries the packages first to a position where one hopper discharges directly into the packages and partially fills the same, mechanism which closes the outlet from the first hopper after a predetermined open period irrespective of the weight or quantity of goods, mechanism which then transfers the packages to the scales, mechanism which then opens the flow from the second hopper directly into the packages while on the scales, and mechanism which is actuated by the tipping of the scales to cut off the flow, substantially as described.

7. In a weighing and package-filling machine, the combination of two hoppers, mechanism which carries the package first to a position where one hopper discharges directly into the package, mechanism which cuts off the flow from the first hopper when the package is partially filled, mechanism which then transfers the package to the scales, mechanism which opens the flow from the second hopper directly into the package while on the scales, and mechanism which is actuated by the tipping of the scales to cut off the flow, substantially as described.

8. In an automatic weighing apparatus, the combination of a support adapted to receive a receptacle, a scale having its pan adjacent to said support, main and secondary valves located above said support and scale respectively, power-driven mechanism for operating said valves, a device for arresting the closing movement of the secondary valve, means operative with the tipping of said scale for releasing said arresting device, and means for transferring a receptacle from said support to said scale.

9. In an automatic weighing apparatus, the combination of a support, a main valve, a power-driven shaft and means carried thereby for controlling the opening and closing of said valve, a secondary valve, a scale, means for stopping said shaft, and means operative with said scale for closing said secondary valve and simultaneously releasing said shaft.

10. In an automatic weighing apparatus, the combination of a support, a main valve and means for operating the same to deliver a time stream of material to a receptacle held on said support, a scale, a secondary valve and mechanism for operating the same, an electric circuit including an electromagnet having its armature carried by the closing means for said secondary valve, whereby, when the circuit through said magnet is closed, the valve is held open, and means operative with the tipping of the scale for breaking the circuit through said magnet.

11. In an automatic weighing apparatus, the combination of a fixed support, means for delivering an approximate load of material to a receptacle held thereon, means for settling said material while on the support, a scale adjacent to the support and adapted to receive said receptacle therefrom, and means for delivering material to the receptacle while on the scale to complete said load.

12. In an automatic weighing apparatus, the combination of a fixed support, a perforated cover adapted to be placed upon a receptacle held on said support, and to supplement the capacity thereof, means for delivering an approximate load of material to said cover and receptacle, means for wrapping the latter while on the support, a scale adjacent to the support and adapted to receive said receptacle therefrom, and means for delivering material to the receptacle while on the scale to complete said load.

13. In an automatic weighing apparatus, the combination of a scale, a valve adapted to control the flow of material thereto, an electromagnet arranged to control the closing of said valve, an energizing-circuit therefor, and a circuit-breaker included in said circuit and arranged to be engaged and operated by said scale after a complete load of material has moved the latter through a predetermined distance from its normal position, for the purpose set forth.

14. In an automatic weighing apparatus, the combination of a valve, mechanism for opening and closing the same, a scale, a resilient or yielding support interposed between said scale and said mechanism, and means operative with a movement of said scale for causing the operation of the valve-closing mechanism.

15. In an automatic weighing apparatus, the combination with a scale having a series of parallel openings in the supporting-surface of its pan, of a removing device comprising a series of suitably-supported parallel rollers spaced apart to correspond with said openings, some of said rollers being normally located within the same beneath the supporting-surface of the scale-pan, means for rotating said rollers, and means operative with the descent of the scale-pan for elevating said rollers above the supporting-surface thereof to receive the weight of a filled receptacle, for the purpose set forth.

16. In an automatic weighing apparatus, the combination of a scale having a series of parallel openings in the supporting-surface of its pan, a series of suitably-supported parallel rollers spaced apart to correspond with said openings, some of said rollers being normally located within the same beneath the supporting-surface of the scale-pan, means for rotating said rollers, means operative with the descent of the scale-pan for elevating said rollers above the supporting-surface thereof, a tray arranged to travel in a direction at right angles to the travel of said rollers and having a bottom formed of slats adapted to pass between said rollers, and means for varying the relative elevation of the rollers and the tray.

17. In an automatic weighing apparatus, the combination with a scale, of a valve, an electrical device for controlling the closing of said valve, and a circuit-breaker operative with the movement of said scale and comprising a lever, a support therefor, and a spring arranged normally to hold said lever and support in contact with each other.

18. In an automatic weighing apparatus, a conveying device comprising a chute, a lever 39, provided with a supporting portion 43, a guide 42, and an arresting-arm 44, a support provided with a guide and stop 12, and means for actuating said lever transversely to the end of said chute.

19. In an automatic weighing apparatus, the combination of a fixed support provided with a stop 59 adapted to engage the bottom of a receptacle, a lever having a slotted portion 43 adapted to deliver receptacles successively to said support, means for actuating said lever, and means for delivering receptacles thereto.

20. In an automatic weighing apparatus, the combination of a fixed support, a scale adjacent thereto, means for delivering material to receptacles held on said support and scale, a lever adapted to receive a receptacle, means for swinging said lever and receptacle over the top of said support and thereby pushing a previously-delivered receptacle onto said scale, means for preventing the withdrawal of a receptacle from the support on the reverse movement of the lever, and means for operating said lever.

21. In an automatic weighing apparatus, the combination of a main valve and a secondary valve, means for operating the same, a fixed support and a scale located below said valves respectively, means for removing a filled receptacle from the scale-pan, means for pushing an empty receptacle against the preceding receptacle under said main valve, and thereby pushing the same from said support onto the scale-pan, and means operative with the tipping of said scale for causing the closing of the secondary valve and the operation of said mechanism for transferring receptacles.

22. In an automatic weighing apparatus, the combination of a support adapted to receive a receptacle, means for delivering an approximate load of material thereto, a perforated cap or cover adapted to be placed over a receptacle to increase the capacity thereof temporarily, means for settling the material in said receptacle, a scale, means for delivering a drip stream of material thereto, and means for transferring a receptacle from said support to said scale.

23. In an automatic weighing apparatus, the combination with a fixed support and a valve, of a vessel-shaped cover located between said valve and support and adapted to be fitted to the top of a receptacle, a lever carrying said cover, a power-driven shaft, and a cam secured to said shaft and timed to operate said lever before and after the delivery of material through said valve.

In testimony whereof I have signed my name to this specification, in the presence of two subscribing witnesses, this 14th day of December, A. D. 1896.

EDWARD G. THOMAS.

Witnesses:
　Geo. H. Cushman,
　Wm. H. Varnum.